Sept. 9, 1969 F. J. BRAGA 3,466,561

ACTIVE EQUALIZER UTILIZING BALANCED DIFFERENTIAL AMPLIFIER

Filed Jan. 25, 1967 2 Sheets-Sheet 1

INVENTOR
F. J. BRAGA
BY
R. B. Ardis
ATTORNEY

Sept. 9, 1969 F. J. BRAGA 3,466,561

ACTIVE EQUALIZER UTILIZING BALANCED DIFFERENTIAL AMPLIFIER

Filed Jan. 25, 1967 2 Sheets-Sheet 2

United States Patent Office 3,466,561

Patented Sept. 9, 1969

3,466,561
ACTIVE EQUALIZER UTILIZING BALANCED DIFFERENTIAL AMPLIFIER

Felix J. Braga, Morristown, N.J., assignor to Bell Telephone Laboratories, Incorporated, Murray Hill and Berkeley Heights, N.J., a corporation of New York Filed Jan. 25, 1967, Ser. No. 611,753
Int. Cl. H03f 3/68
U.S. Cl. 330—30 5 Claims

ABSTRACT OF THE DISCLOSURE

An active attenuation equalizer circuit utilizes a balanced differential amplifier with a constant current source. One input to the circuit receives the signal to be equalized while the other input is connected to a wave shaping network. The constant current source causes reflection of the shaping network into the input terminal that receives the signal to be equalized; thus, waveshape compensation is furnished.

BACKGROUND OF THE INVENTION

This invention relates generally to long line transmission systems and more particularly to a device which compensates for transmission line attenuation. Information carried on long transmission lines, such as cables, experiences attenuation which is frequency-dependent. In order to transmit information, it is necessary to compensate for this frequency-dependent attenuation because the original signal could be attenuated so that it would be indistinguishable from local noise signals. A more significant problem is that the frequency-dependent attenuation may cause severe distortion which can be problematic where pulse information is sought to be transmitted. The attenuation-frequency characteristic of the transmission line is corrected to be approximately a flat loss v. frequency characteristic. Then the compensated signal is amplified by a flat gain amplifier in order to reconstruct the original signal.

The frequency-dependent attenuation can be made non-frequency dependent by use of a simple RC circuit, but this circuit has significant disadvantages when used in a transmission line. Due to the frequency dependency of an RC circuit it is impossible to provide for matching impedances at the input or output terminals. To remedy this situation a bridged-T equalizer is used.

This latter equalizer is designed to provide a constant impedance at its input and output terminals which is nonfrequency dependent while compensating for the frequency attenuation characteristic of the transmission line. In order to provide the above mentioned features, it is necessary for the equalizer to use precise inductive and capacitive networks. When operating in the voice frequency range, as is often the case in telephone transmission, these inductors tend to be large, unwieldy, expensive and have low Q's. Since the bridged-T equalizer is composed of only passive elements there is additional attenuation net gain through this circuit. If the original signal is too severely attenuated, then the local noise at the input of the amplifier might mask the attenuated original signal. The transfer characteristic of the equalizer usually will decrease with increasing frequency to a minimum point and they may start increasing with increasing frequency. In this case, the resultant loss slope of equalizer plus facility is steepened and reflects more phase shift in the region of the band edge. The active equalizer can be designed to reduce this slope and thereby reduce the phase shift in the band edge region. In some systems it may be necessary to phase equalize, because the distortion can be critical.

In addition, the bridged-T equalizer is not capable of transforming an unbalanced input to a balanced output, i.e., if the input is balanced the output must be balanced; likewise, if the input is unbalanced the output must be balanced. When the bridged-T equalizer is desired to be used in a balanced to balanced mode, many additional elements are required.

A primary object of the present invention is therefore to eliminate the need for large and precise inductors in equalizer circuitry.

A further object of the present invention is to furnish an equalizer which can supply a net transmission gain or loss, as desired, through the equalizer thus reducing the noise and phase shift distortion that are often problems encountered in the prior art.

A still further object of the present invention is to provide an equalizer that can supply a balanced or unbalanced output, either of which may be chosen depending on the circuitry following the equalizer.

These above objects are accomplished through use of an equalizer which utilizes a balanced differential amplifier supplied with a constant current source. The balanced differential amplifier is used in an unorthodox manner in that only one of its two input terminals receives the transmitted signal to be equalized. A waveshaping device is connected between the other input terminal and a point of reference potential. Due to the constant current source, the characteristics of the waveshaping device are reflected into the input terminal that receives the signal to be equalized, thus furnishing the compensation for the loss characteristic of the transmission line.

The balanced differential amplifier of the applicant's equalizer provides high input and low output impedances. In order to match the facility to be equalized at the input, a shunt impedance is connected between the input terminal which receives the signal to be equalized and a point of reference potential. Since the output impedance of the present invention is low, matching is achieved at the output terminal merely by adding a series network thereto. The differential amplifier utilizes active elements thus furnishing any desired net transmission gain or loss. This net transmission gain minimizes the nose and phase shift problems encountered in the prior art. Further, the present invention is capable of providing a balanced or unbalanced output, as desired, with no change in the circuit configuration.

The present invention can be composed of only capacitive, resistive, and active semiconductor elements which lend themselves to present integrated circuitry and thin film circuit techniques. Thus, the size of this balanced differential amplifier equalizer may be exceedingly small.

A more complete understanding of the above mentioned and other features of the invention may be obtained from a study of the following detailed description of a specific embodiment of the invention.

DETAILED DESCRIPTION

Figure 1:
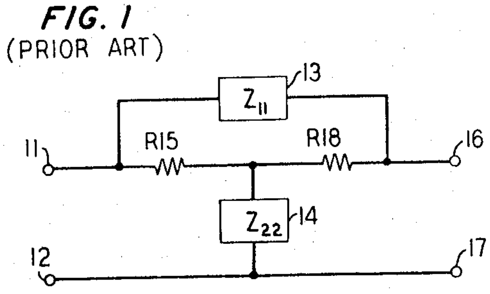
FIG. 1 (PRIOR ART)
FIG. 1 is a circuit diagram of the prior art bridged-T equalizer.

Compensation for the attenuation characteristic of a transmission line could be accomplished by using a simple RC network, as discussed above, but since the RC network fails to provide proper termination impedance at either the input or output ports there is need to furnish a different type of equalizer. The most common type is the bridged-T equalizer shown in FIG. 1. Input terminal 11 is connected to one side of resistor R15 and to one side of the bridging impedance 13. The other side of resistor R15 is connected to resistor R18 and to impedance 14. The other side of resistor R18 is connected to the other side of the bridging impedance 13 at the output terminal 16. Input terminal 12 and output terminal 17 would be connected to a point of reference potential.

A complete analysis of the bridged-T equalizer can be found on pages 188–92 of "Principles of Electricity Applied to Telephone and Telegraph Work," published by the American Telephone & Telegraph Company, January 1953. As demonstrated therein, the relationship between the elements of this type of equalizer can be shown to be $Z_{11}Z_{22}=R^2$ in order to furnish the desired input and output matching impedances. Since there is an inverse relationship between $Z_{11}$ and $Z_{22}$ there is need for precise inductive and capacitive networks necessitating the use of precise inductors. In the voice frequency range these inductors often tend to be large and expensive. The overall loss-frequency characteristic of the bridged-T equalizer circuit is determined by the bridging series impedance network $Z_{11}$.

Figure 2:
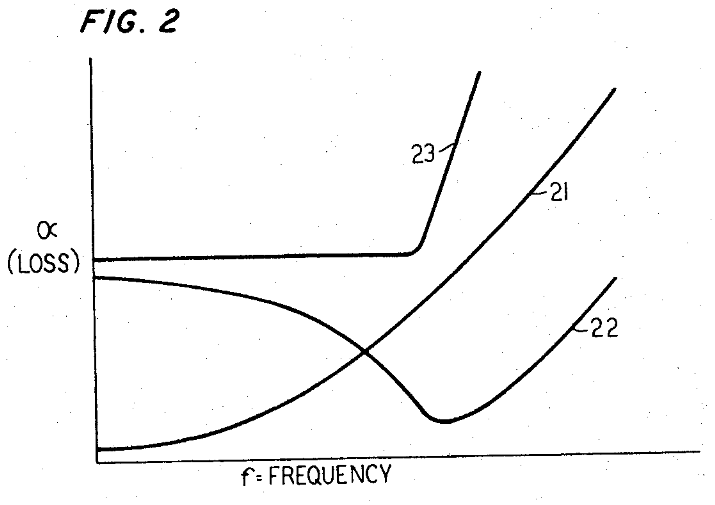
FIG. 2 shows a series of curves illustrating the operation of the bridged-T equalizer shown in FIG. 1.

FIG. 2 shows a series of curves illustrating the operation of the bridged-T equalizer shown in FIG. 1. An input signal having a characteristic shown as curve 21 is applied to terminals 11 and 12. Curve 21 is a representation of the loss v. frequency characteristic of a standard transmission line. Curve 22 is a representation of the loss v. frequency characteristic of the bridged-T equalizer as determined by bridging impedance 13. Curve 23 shows the result of passing the signal represented by curve 21 through the bridged-T equalizer. As can be seen in FIG. 2, curve 23 is approximately flat until curves 21 and 22 cross. At that point the attenuation of the resulting output signal from the equalizer increases more rapidly with increasing frequency than before passing the signal represented by curve 21 through the bridged-T equalizer. A plot of the corresponding phase shift v. frequency characteristic would show a significant phase shift distortion in the combined transmission line-equalizer transmission path. It may be necessary then at the output of this bridged-T equalizer to furnish phase shift compensators where phase shift (delay) is critical, as in data transmission systems.

Due to the absence of active elements, there is a loss produced by the bridged-T equalizer of FIG. 1 which can be shown to $$20 \log \frac{R+Z_{11}}{R}$$

where R is the termination impedance. This is diagrammatically shown by curve 23 of FIG. 2 where the loss through the transmission line and bridged-T equalizer is the summation of the individual losses due to the transmission line and equalizer. The total attenuation could be substantial. The resulting wave form is normally applied to a flat gain amplifier which compensates for the flat attenuation loss due to the transmission line and bridged-T equalizer. Since the original signal has been severely attenuated through the transmission line and equalizer, the signal reaching the input of the amplifier could be masked by local noise signals present at the input terminals of the amplifier, thus interfering with the accuracy of the transmission.

The bridged-T equalizer shown in FIG. 1 normally is used to receive an unbalanced signal, at input terminals 11 and 12. Since input terminal 12 is directly connected to output terminal 17, the output signal must also be unbalanced. When the bridged-T equalizer is used in a balanced to balanced mode, additional elements are required. These additional elements are used to form another bridged-T arm and thus would be the same as the resistors R15 and R18 and the impedance $Z_{11}$ arm. This lack of conversion from balanced to unbalanced or unbalanced to balanced in the bridged-T equalizer can be problematic in that the source signal feeding the equalizer might be balanced or unbalanced, while the signal desired at the output might be unbalanced or balanced, respectively.

Figure 3:
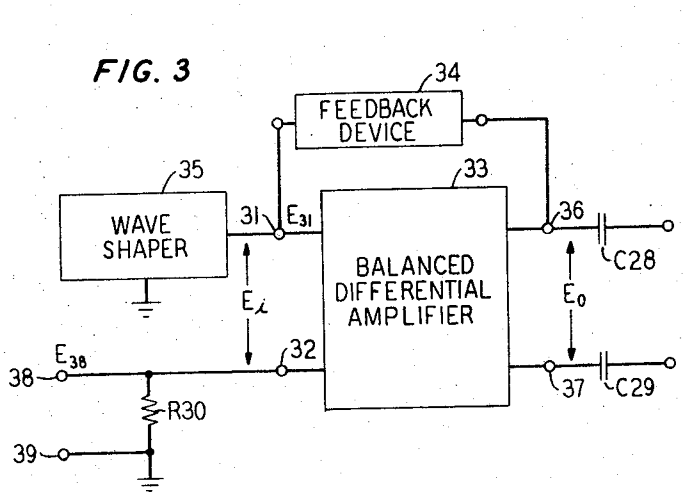
FIG. 3 is a block diagram of the applicant's equalizer invention utilizing a balanced differential amplifier.

It would be desirable, therefore, to be able to provide an equalizer without the significant disadvantages of the prior art devices. This has been accomplished by the embodiment of applicant's invention shown in the block diagram of FIG. 3. Referring to FIG. 3, the equalizer is composed of a balanced differential amplifier 33 which is connected at one input terminal 32 to the signal to be equalized which is fed into terminals 38 and 39. The other input terminal 31 is connected to one terminal of a two terminal waveshaper 35, the other terminal of which is connected to a point of reference potential. A feedback device 34 which controls the output level is connected between input terminal 31 and output terminal 36. The output from this equalizer is provided at output terminals 36 and 37 so that both terminals can be used to produce a balanced output or only one terminal can be used in association with a point of reference to supply an unbalanced output.

Capacitors C28 and C29, connected to output terminals 36 and 37 respectively, form no part of the present invention but are merely inserted as DC blocking capacitors. With selection of the proper balanced differential amplifier, these blocking capacitors would not be needed.

Figure 4:
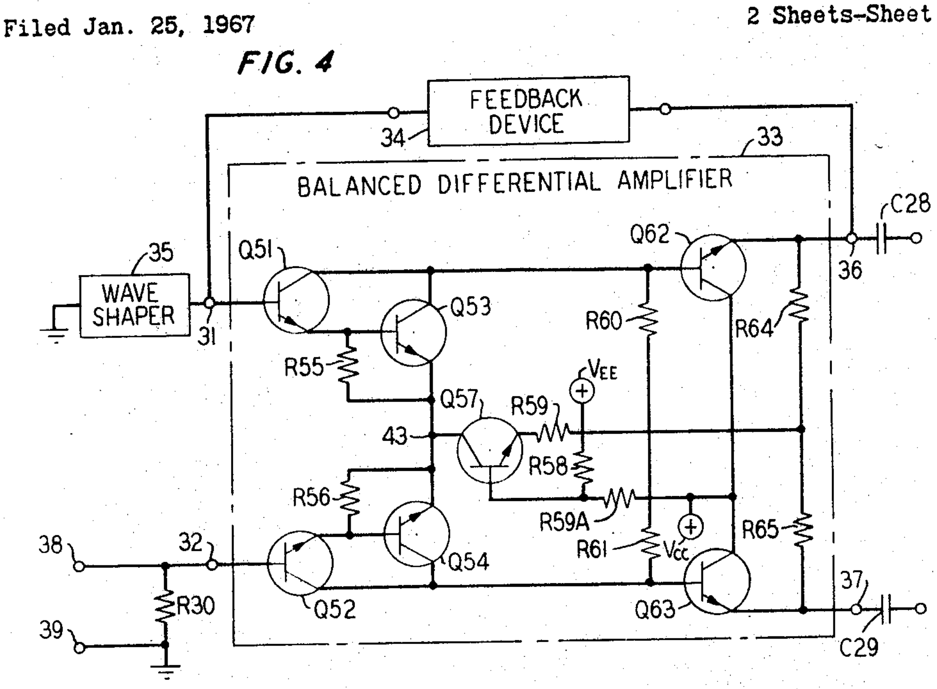
FIG. 4 is a schematic diagram of the balanced differential amplifier equalizer circuit shown in FIG. 3.

A schematic diagram of an embodiment of the applicant's invention is shown in FIG. 4. There, the differential amplifier circuit which is merely representative of any standard differential amplifier circuit is shown in more detail.

Input terminal 31 is connected to one side of a symmetrical input stage. Input terminal 31 is connected to the base terminal of transistor Q51, the collector of which is connected to the collector of transistor Q53. The emitter terminal of transistor Q51 is connected to the base terminal of transistor Q53. Resistor R55 is connected between the base and emitter terminals of transistor Q53. A similar circuit forms the other portion of the symmetrical input stages. Input terminal 32 is connected to the base terminal of transistor Q52, the collector of which is connected to the collector of transistor Q54. The emitter terminal of transistor Q52 is connected to the base terminal of transistor Q54. Resistor R56 is connected between the base and emitter terminal of transistor Q54. The symmetrical input stages are connected at interconnection point 43 where the emitter of transistor Q53 is connected to the emitter of transistor Q54. Interconnection point 43 is also fed by a constant current source which comprises transistor Q57, the collector of which is connected to interconnection point 43. Resistor R59 is connected between the emitter terminal of transistor Q57 and a point of positive potential. The point of positive potential is also connected to resistor R58. The other side of resistor R58 is connected to the base terminal of transistor Q57 and to one side of resistor R59A. The other side of resistor R59A is connected to a second source of positive potential.

The operation of a constant current source is well known in the art. A constant current source is a device in which the source resistance is so high that the current output from the device remains essentially constant despite variations in the load impedance. Therefore, the current flowing from the constant current circuit to connection 43 is constant. One portion of the symmetrical output stages of the balanced differential amplifier is comprised of resistor R60, which is connected to the collectors of transistors Q51 and Q53 and to the base terminal of transistor Q62. The other side of resistor R60 is connected to said second source of positive potential. The other portion of the symmetrical output stage is comprised of resistor R61, one side of which is connected to the collectors of transistors Q52 and Q54 and the base terminal of transistor Q63. The other side of resistor R61 is connected to said second source of positive potential. The collectors of output transistors Q62 and Q63 are connected together. The emitter terminals of transistors Q62 and Q63 are connected by means of resistors R64 and R65. One side of resistor R64 is connected to the emitter terminal of transistor terminal Q62. The other side of resistor R64 is connected to said first source of positive potential. Resistor R65 is connected at one side to the emitter terminal of transistor Q63. The other side of resistor R65 is also connected to said first portion of positive potential. The connection point between the emitter terminal of transistor Q62 and one side of resistor R64 is the output terminal 36 which is connected to the blocking capacitor C28. The connection point between the emitter of transistor Q63 and one side of resistor R65 is the output terminal 37 which is connected to the DC blocking capacitor C29.

Figure 5:
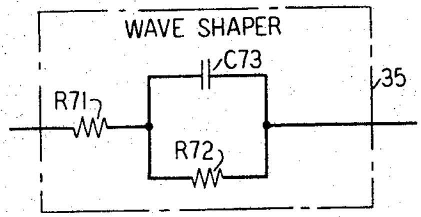
FIG. 5 is an illustration of a network suitable for use as a waveshaper.

A feedback device 34 which controls the system gain and serves as level control is connected between output terminal 36 and input terminal 31. This device may be composed of active or passive elements as desired in order to provide the type of level control desired. A waveshaper 35 is connected between input terminal 31 and a point of reference potential. The differential amplifier is utilized in a novel manner in that the input signal is brought into only one terminal 32 of the two input terminals. One example of a waveshaper is that shown in FIG. 5.

The transfer characteristic of the applicant's equalizer circuit is a gain (or loss if desired) v. frequency characteristic which will compensate for the transmission characteristics of the transmission line. The transfer characteristic will now be derived with reference to FIG. 3:

$E_i$=differential voltage,
$E_{31}$=voltage at terminal 31, and
$E_{38}$=input signal to be equalized.

Let feedback device 34 be represented by $R_1$ and let $Z_2$ represent the impedance of waveshaper 35.

$$\frac{E_{38}+E_i}{Z_2}=\frac{E_0-(E_i+E_{38})}{R_1} \qquad (1)$$

The assumption that no current flows into the differential amplifier at terminal 31 is valid as the gain of the differential amplifier approaches infinity. Assume for simplification purposes that the gain of the differential amplifier approaches infinity. The actual gain of the differential amplifier can be made as large as desired and is normally operated at a high gain.

Then:

$$E_0=-AE_i$$

$$E_i=E_0/A$$

and $E_i \to 0$ as $A \to \infty$

Using this fact and substituting into Equation 1 above:

$$\frac{E_0}{E_{38}} \cong 1+\frac{R_1}{Z_2}$$

Thus, it is possible to derive a net gain through the applicant's equalizer that is frequency dependent. Of course, the feedback device and the waveshaper can be composed of more complex circuitry which would allow for compensation of very complex inputs. The equalizer, therefore, can find use in any circuit where attenuation compensation is desired.

One of the problems of the simple RC network was that of impedance matching. The applicant's invention provides a very high input impedance at the input terminal that receives the signal to be equalized. Therefore, impedance matching at the input is easily obtained by merely selecting any desired impedance network and placing it across terminals 38 and 39 of FIG. 3 as has been done with resistor R30 in FIGS. 3 and 4.

The input impedance of a balanced differential amplifier with a constant current source is well known in the art to be very high due to the constant current source high impedance. In the applicant's circuit of FIG. 4, the input impedance can be shown to be approximately $Z_2\,(1+A\beta)$, where $Z_2$ is a representation of the impedance of waveshaper 35. $A\beta$ as a first approximation could be equal to 100. Therefore, $Z_{in}$ would be equal to $Z_2 \times 100$. Since $Z_2$ may be composed of active and passive elements, the minimum impedance $Z_2$ would be the purely resistive component of the impedance. Assuming this to be, for instance, as low as 500 ohms, the minimum input impedance would be 100×500 ohms or 50,000 ohms. Normally, the shunt resistance R30 would assume a value of approximately 600 ohms. Since $Z_{in}$ is a minimum of 50,000 ohms any variation therein would not materially affect a parallel network consisting of a 600 ohm resistor and $X_{in}$ because the only variation in $Z_{in}$ would be that of increasing impedance. Since the effect of a 50,000 ohm impedance across a 600 ohm impedance is minimal the effect of anything above a 50,000 ohm impedance is even less significant. The output impedance of the differential amplifier is obviously very low upon inspection of FIG. 4, since resistors R60 and R61 are seen at the output terminals 36 and 37 respectively through transistors Q62 and Q63 respectively. The effective output impedance is then the base resistance of transistors Q62 and Q63 divided by the $\beta$ of these transistors. Since $\beta$ of these transistors could easily approach 100, the output impedance would then be equal to the resistance in the base circuit divided by 100. It is not uncommon for the resistance to be below 50K. Thus, the output impedance would be below 500 ohms and to properly match the receiving device, a series network could be easily added to the output terminals 36 and 37. Of course, with a feedback device the output impedance is even decreased further by the $\mu\beta$ product. Since $\mu\beta$ is commonly in the range of 50, the output impedance when feedback is added would be below 10 ohms.

Applicant's device provides attenuation equilization without the use of large and precise inductors. In the bridge-T equalizer circuit, inductors were needed to provide proper impedance matching. Due to the characteristics of the differential amplifier, impedance matching is achieved without the need for inductors. Differential amplifiers in the integrated circuitry field are small and in the future will be inexpensive. Thus this equalized circuit lends itself very well to the advancing integrated circuitry and thin film technology.

One of the disadvantages of the bridged-T equalizer is that there is attenuation through it which can give rise to noise and phase shift problems. The applicant's equalizer provides a net transmission gain, if desired, through the equalizer circuit which can result in further spacing between equalizers. Of course, noise and phase shift problems encountered by the bridged-T equalizer can be minimized with the applicant's equalizer as can be seen with reference to FIG. 6 which shows a series of curves illustrating the operation of the applicant's invention shown in FIGS. 3 and 4. Curve 81 represents the signal to be equalized. Curve 82 is a representation of the transmission characteristic of the equalizer of FIG. 3. It is apparent that, since the equalizer can provide a transmission gain, curve 82 can be placed in the fourth quadrant. The result of passing the signal represented by curve 81 through the applicant's equalizer circuit is represented by curve 83. The applicant's equalizer has been adjusted to provide a net transmission gain which is represented by curve 83. As can be seen by a comparison of resultant curve 83 in FIG. 6 and resultant curve 23 of FIG. 2, the attenuation rises less rapidly with increasing frequency in curve 83 than it does in curve 23. Therefore, the phase shift produced by the use of applicant's equalizer is significantly less than the phase shift produced when using the standard bridge-T equalizer. Consequently there is also an additional advantage in using the applicant's invention in that the need for phase shift compensators can be minimized.

Figure 6:
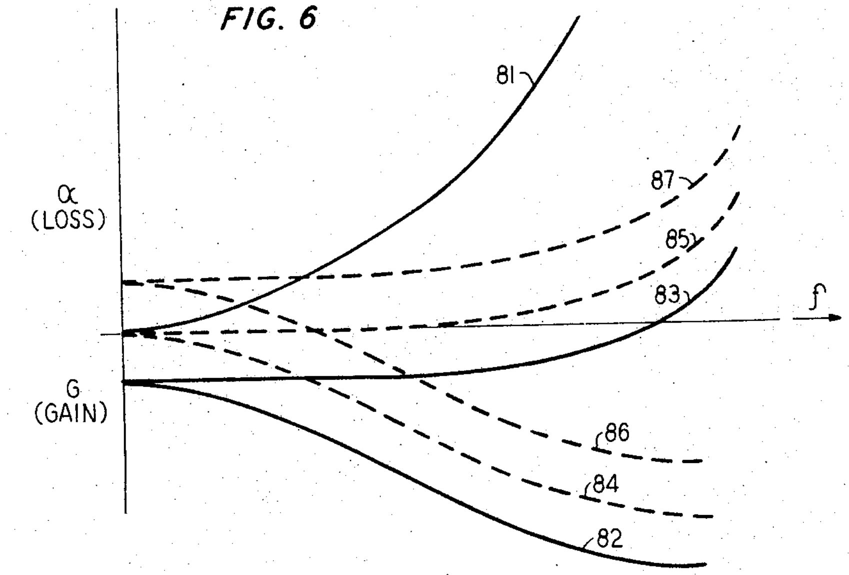
FIG. 6 shows a series of curves illustrating the operation of the embodiment of applicant's invention shown in FIGS. 3 and 4.

FIG. 6 demonstrates the varying resultant characteristics obtainable by varying the output level as controlled by feedback device 34 in FIGS. 3 and 4. Curve 84 is representative of the equalizer circuit utilizing less gain than was utilized by the equalizer as represented in curve 82. The result of passing a signal represented by curve 81 through the equalizer having a characteristic curve 84 is shown by curve 85. Similarly, by adjusting the feedback device it is possible to produce a characteristic curve of the applicant's equalizer as represented by curve 86. Curve 87 represents the result of passing a signal with the characteristic curve 81 through the equalizer having adjusted characteristic curve 86. Thus it is seen that by varying the output level with the feedback device differing resultant curves can be produced.

Applicant's equalizer has the capability of providing a balanced or unbalanced output at terminals 36 and 37. A balanced output can be derived by utilizing both terminals 36 and 37 and an unbalanced output can be provided by utilizing either output terminal and a point of reference potential. It is clear then that the applicant's equalizer is capable of transforming an unbalanced input to a balanced output.

It is to be understood that the above described circuit is illustrative of the application of the principles of the invention. Numerous other arrangements may be devised by those skilled in the art without departing from the spirit and scope of the invention.

What is claimed is:

1. In a transmission system an electrical circuit capable of equalizing transmission loss distortion comprising a balanced differential amplifier having two input and two output terminals, means connected between one input terminal and a point of reference potential for shaping the signal appearing at said output terminals, constant current source means, said constant current source means causing a reflection of the impedance of the signal shaping means at the other input terminal, and means to connect the signal to be equalized between the other input terminal and a point of reference potential whereby only input terminal receives the signal to be equalized.

2. Apparatus as defined in claim 1 in which further means are connected between one of said output terminals and the same input terminal as is said signal shaper connected to for adjusting the signal level appearing at said output terminals.

3. In a transmission system, an electrical circuit capable of equalizing transmission loss distortion comprising a pair of input terminals, a pair of output terminals, a pair of transmission paths each connected between a respective one of said input terminals and a respective one of said output terminals, each of said transmission paths including at least an input stage and an outuput stage, means to interconnect said input stages and means to interconnect said output stages, means connected between one input terminal and a point of reference potential for shaping the signal appearing at said output terminals, constant current source means, said constant current source means causing a reflection of the impedance of the signal shaping means at the other input terminal, and means to connect the signal to be equalized between the other input terminal and a point of reference potential whereby only one input terminal receives the signal to be equalized.

4. Apparatus as defined in claim 3 in which further means are connected between one of said output terminals and the same input terminal as is said signal shaper connected to for adjusting the signal level appearing at said output terminals.

5. Apparatus as defined in claim 3 wherein said waveshaper consists of only resistive and capacitive elements.

References Cited

UNITED STATES PATENTS 3,010,087 11/1961 Ebbe et al. ---------- 333—28

ROY LAKE, Primary Examiner

L. J. DAHL, Assistant Examiner

U.S. Cl. X.R.

333—28